April 16, 1929.  E. O. WOEKECK  1,708,992
MOTOR STETHOSCOPE
Filed Nov. 10, 1926
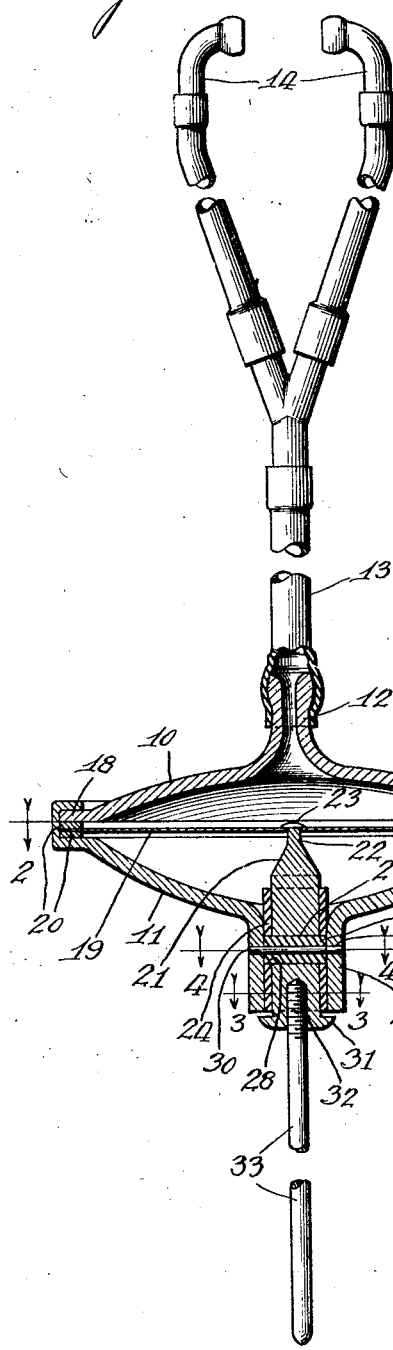
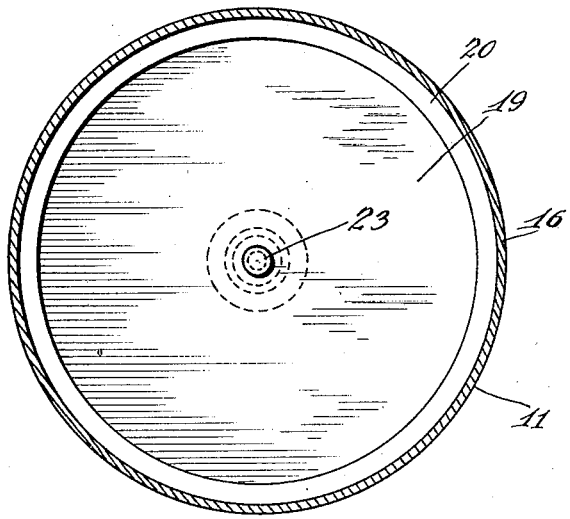
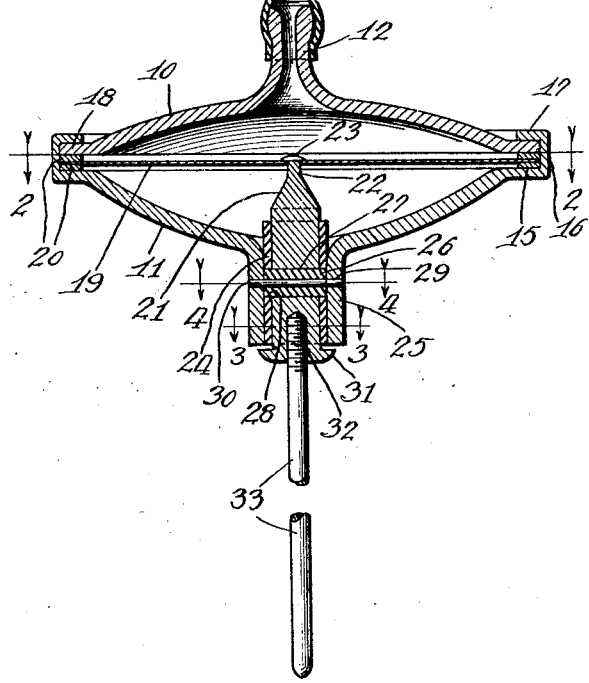
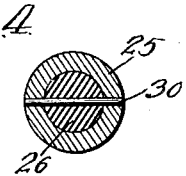
Inventor:
Emil O. Woekeck
By John P. Smith
Atty.

Patented Apr. 16, 1929.

1,708,992

UNITED STATES PATENT OFFICE.

EMIL O. WOEKECK, OF CHICAGO, ILLINOIS.

MOTOR STETHOSCOPE.

Application filed November 10, 1926. Serial No. 147,425.

This invention relates to a motor stethoscope.

One of the objects of the present invention is to provide a simple and efficient motor stethoscope which is particularly adapted for locating all knocking or other noises such as occur in motors or other machinery, and the like.

Another object of the invention is to provide a new and improved form of stethoscope in which the diaphragm of the stethoscope is fully protected from injury in event the stethoscope is accidentally dropped on the floor by reason of rough handling.

These and other objects are accomplished by providing the construction and arrangement of the various parts in the manner hereinafter described, and particularly pointed out in the appended claims.

Referring to the drawings:

Figure 1 is a side elevational view partly in cross section, showing the construction in my improved stethoscope;

Figure 2 is a cross-sectional view taken on the line 2—2 of Figure 1;

Figure 3 is a cross-sectional view taken on the line 3—3 of Figure 1; and

Figure 4 is a cross-sectional view taken on the line 4—4 of Figure 1.

In illustrating one form of my invention I have shown the same as comprising an upper housing member 10 and lower housing member 11. These housing members form the casing for my diaphragm and are in the form of two concave disks. The upper housing member 10 is provided at its longitudinal center with a nipple 12, which is adapted to receive a suitable rubber conduit 13, which in turn is connected to the usual ear pieces 14. The lower housing member 11 is provided adjacent its periphery with an annular recess 15 which is formed by a vertically extending portion 16, which in turn terminates with an inwardly extending annular flange 17. The vertically and inwardly extending portions 16 and 17 are formed integrally with the lower housing member 11. Housed in the annular recess 15 is a horizontal peripheral portion 18 of the upper housing member 10. Positioned between the peripheral portion 18 of the housing member 10 and the base of the recess 15 is a disk-shaped diaphragm 19.

The diaphragm 19 is preferably made of metal and is mounted between two paper washers 20. Secured to the center of the diaphragm 19 is a sound transmitter or diaphragm connecting member 21. The connecting member has a relative reduced portion as shown at 22, which extends through an aperture centrally located in the diaphragm and has its upper portion extending through the diaphragm riveted as shown at 23 for securing the same to the diaphragm. The connecting member 21 is mounted within a vertically positioned fibre or rubber bushing 24, which in turn is mounted within a cylindrical extension 25, which is formed integrally with the lower housing member 11.

By positioning the fibre or rubber bushing 24 between the connector 21 and the cylindrical extension 25 of the housing member 11, the bushing forms to a certain extent an insulation and eliminates any vibration which might be transmitted from the connector to the housing.

In order to further eliminate any vibration between the housing members and the sound transmitting members, I have provided a transversely extending bushing 26. This bushing 26 is preferably made of rubber or fibre and extends through an aperture 27 in the connecting member 21 and thru registering apertures 28 in the opposite sides of the bushing 24. Extending through the bushing 26 and through aligned apertures 29 in the extension 25 is a steel pin 30. The pin 30 secures the connector 21 and bushing 24 from displacement with respect to the housing.

From the above description it will be seen by providing the fibre or rubber bushing 26 with the steel pin 30 extending therethrough that I have provided means whereby the vibration to the diaphragm is limited, but at the same time is sufficient to transmit the vibration to the diaphragm.

It will also be noted that should the stethoscope with the connector or any extension thereof be accidentally dropped, this pin 30 prevents the diaphragm 19 from any serious injury or distortion.

The lower end of the connector 21 is provided with an enlarged flange portion 31, which is normally spaced from the lower edge of the cylindrical portion 25, and it is also provided with a longitudinally extending bore located at the lower end as shown at 32. Mounted in the bore 32 by threaded engagement is a sound transmitter rod 33, which permits the stethoscope to be positioned in contact with parts of the motor or machines which would otherwise be inaccessible to the stethoscope without such an extension.

In the use of my improved stethoscope the sound transmitting rod 33 may be used or disconnected from the sound transmitting or connector member 21, depending on the location and the accessibility of the parts to be tested. And when the sound transmitting rod 33 or the connecting member 21 is placed in contact with that part to be tested for locating the knocking or other noises of the machinery being tested, the vibration will be transmitted from the connector to the diaphragm 19, which in turn will transmit the vibration to the ear pieces 14.

If by accident the stethoscope should be dropped on the floor or struck against machinery, the possibility of injury or distortion to the diaphragm is eliminated by reason of the pin 30 extending through the connector member 21, and at the same time by providing a flexible bushing as shown at 26 I have permitted the member connecting the diaphragm with the sound transmitting rod to vibrate sufficiently so that the efficiency of my stethoscope is still maintained.

While I have described in the above specification one embodiment which my invention may assume in practice, it will of course be understood that the same is capable of modification and that modification may be made without departing from the spirit and scope of the invention as expressed in the appended claims:

What I claim as my invention and desire to secure by Letters Patent is:

1. A stethoscope comprising a casing in the form of two oppositely disposed concave disks, a diaphragm mounted between said disks, a sound transmitting member connected to said diaphragm, and resilient means operatively connecting said sound transmitting member with one of said disks.

2. A stethoscope comprising a casing in the form of two oppositely disposed concave disks, a diaphragm mounted between said disks, a sound transmitting member connected to said diaphragm, and means operatively connecting said sound transmitting member with one of said disks whereby said sound transmitting member is limited in its movement with respect to said disks.

3. A stethoscope comprising a casing, a diaphragm mounted in said casing, a sound transmitting member connected to said diaphragm, and means secured to said casing and operatively connected to said sound transmitting member for limiting the movement of said sound transmitting member with respect to said casing.

4. A stethoscope comprising a casing, a diaphragm mounted in said casing, a sound transmitting member secured to said diaphragm, means secured to said casing and extending through said sound transmitting member, and yielding means embracing said last-named means and contacting with said sound transmitting member for permitting said sound transmitting member to vibrate with respect to said casing.

5. A stethoscope comprising a casing in the form of two oppositely disposed concave disks, a diaphragm mounted between said disks a cylindrical extension formed integrally with one of said disks, a sound transmitting member connecting centrally of said diaphragm and extending through said cylindrical extension, and a sleeve of yielding material mounted between said sound transmitting member and said cylindrical extension for limiting the vibration between said sound transmitting member and said casing.

6. A motor stethoscope comprising a casing in the form of two oppositely disposed concave disks, a diaphragm mounted between said disks, a cylindrical extension formed integrally with one of said disks, a sound transmitting member secured centrally of said diaphragm and extending through said cylindrical extension, a sleeve of yielding material positioned between said sound transmitting member and said extension, a second sleeve of yieldable material extending transversely through said first-named sleeve and said sound transmitting member, and a pin extending through said last-named sleeve and said cylindrical extension for limiting the movement of said sound transmitting member with respect to said casing.

7. A stethoscope comprising a casing in the form of two oppositely disposed concave disks, a diaphragm mounted between said disks, a sound transmitting member secured centrally of said diaphragm and extending through one of said disks, and yieldable means operatively connecting said sound transmitting member to one of said disks, whereby said sound transmitting member may move with respect to said disk.

8. A stethoscope comprising a casing in the form of two oppositely disposed concave disks, a diaphragm mounted between said disks, a cylindrical portion formed integrally with one of the said disks, a sound transmitting member secured centrally of said diaphragm and extending through said cylindrical portion, and yielding means operatively connecting said sound transmitting member to said cylindrical extension, and means formed on said sound transmitting member for operatively connecting a sound transmitting rod thereto.

EMIL O. WOEKECK.